United States Patent
Nishino et al.

(10) Patent No.: US 8,527,138 B2
(45) Date of Patent: Sep. 3, 2013

(54) APPARATUS FOR RECORDING VEHICULAR DATA, CONTROLLER FOR RECORDING VEHICULAR DATA, AND VEHICULAR DATA RECORDING SYSTEM

(75) Inventors: Eisuke Nishino, Kariya (JP); Yuuji Nagano, Kariya (JP)

(73) Assignee: Denso Corporation, Kariya (JP)

( * ) Notice: Subject to any disclaimer, the term of this patent is extended or adjusted under 35 U.S.C. 154(b) by 236 days.

(21) Appl. No.: 13/213,441

(22) Filed: Aug. 19, 2011

(65) Prior Publication Data

US 2012/0166038 A1 Jun. 28, 2012

(30) Foreign Application Priority Data

Dec. 24, 2010 (JP) .................................. 2010-287650

(51) Int. Cl.
*G01M 17/00* (2006.01)

(52) U.S. Cl.
USPC ......... 701/32.2; 701/33.4; 701/430; 701/461; 701/540

(58) Field of Classification Search
USPC ...................... 701/32.2, 33.4, 430, 461, 540
See application file for complete search history.

(56) References Cited

U.S. PATENT DOCUMENTS 5,754,965 A 5/1998 Hagenbuch

FOREIGN PATENT DOCUMENTS

| JP | 2002-304649 | 10/2002 |
| JP | 2006-350583 | 12/2006 |

*Primary Examiner* — John Q Nguyen
*Assistant Examiner* — Jordan S Fei
(74) *Attorney, Agent, or Firm* — Nixon & Vanderhye PC (57) ABSTRACT

An apparatus includes a first memory device, a second memory device and a controller. The first memory device stores vehicular data in accident. The second memory device has control data area for storing control data in nonvolatile manner. The controller records the vehicular data stored in the first memory device into the control data area of the second memory device by overwriting the control data in response to vehicular accident. It is possible to increase a recordable amount of vehicular data in vehicular accident without increasing recording capacity exclusively preserved to vehicular data.

11 Claims, 9 Drawing Sheets

| FAILED DEVICE | FAILURE DETAIL | SCORE |
|---|---|---|
| THRMT | THRMT | 10 |
| | THRS/DCF | 10 |
| | THRL (VL/GL) | 10 |
| ACPWL | ACPWL-C | 10 |
| THRSG | THR1 | 10 |
| | THR2 | 2 |
| | THR3 | 10 |
| | THR4 | 10 |
| | THR5 | 2 |
| ACCSN | ACC1 | 5 |
| | ACC2 | 2 |
| | ACC3 | 5 |
| | ACC4 | 2 |
| NESG | NESGF | 2 |
| VHSG | VHSGF | 2 |
| TBSG | TBSGF | 2 |
| STSG | STSGF | 2 |
| OTHER | OTHER | 1 |

APPARATUS FOR RECORDING VEHICULAR DATA, CONTROLLER FOR RECORDING VEHICULAR DATA, AND VEHICULAR DATA RECORDING SYSTEM

CROSS REFERENCE TO RELATED APPLICATION

This application is based on Japanese Patent Application No. 2010-287650 filed on Dec. 24, 2010, the contents of which are incorporated herein by reference in its entirety.

FIELD OF THE INVENTION

The present invention relates to an apparatus for recording vehicular data, a controller for recording vehicular data, and a vehicular data recording system, especially adapted for recording vehicular data in vehicular accident.

BACKGROUND OF THE INVENTION

Conventionally, a device which records several kinds of vehicular data in response to a vehicular accident is known in this field. In such a device, vehicular data such as a velocity of the vehicle, an operating degree of a gas pedal, a brake pressure at a vehicular accident are recorded in order to analyze the accident. JP2002-304649A and JP2006-350583A disclose such devices.

SUMMARY OF THE INVENTION

In order to analyze accident in detail, it is necessary to provide sufficient recording capacity. If a device only has insufficient data recording capacity, it makes difficult to determine the cause of vehicle accident. However, large capacity recording device results in an increase in cost.

It is an object of the present invention to provide an apparatus for recording vehicular data, a controller for recording vehicular data, and a vehicular data recording system that are capable of increasing a recordable amount of vehicular data. Another object of the present invention is to provide an apparatus that is capable of recording vehicular data in vehicular accident without increasing recording capacity exclusively preserved to vehicular data in vehicular accident.

The inventors invented the present invention based on the following views. In vehicle, vehicular data prepared for analysis purpose is stored in a first memory device. In addition, control data to be used to control vehicle is stored in a second memory device in a nonvolatile manner. As data to be reserved at vehicular accident, vehicular data at vehicular accident is more important than control data. In order to record large amount of vehicular data without increasing capacity of the second memory device, the inventors thought that data area for storing the control data may be used as data area for recording the vehicular data.

According to an embodiment of the present invention, an apparatus for recording vehicular data is provided. The apparatus comprises a controller which records vehicular data stored in a first memory device into control data area of a second memory device by overwriting the control data in response to vehicular accident. Therefore, it is not necessary to prepare large amount of data area exclusive to vehicular data in addition to control data area. It is possible to record large amount of vehicular data without increasing capacity of the second memory device.

According to an embodiment of the present invention, the apparatus may include a controller that varies an amount of vehicular data area in accordance with factors relating to vehicular accident to be analyzed. The controller may be capable of being received abnormal information about sensors and actuators. The controller changes an amount of storing capacity for the vehicular data in the second memory device so that the more a number of the abnormal information increases, the more an amount of the control data area in the second memory device is changed to store the vehicular data.

If there are large number of abnormalities of various sensors and various actuators in an accident, it is preferable to record large amount of data to be used to analyze the accident. According to the above-mentioned configuration, it is possible to record large amount of vehicular data which is effective to analysis as the number of the abnormal information increases.

According to an embodiment of the present invention, the controller changes amount of storing capacity for the vehicular data in the second memory device in accordance with a predetermined vehicle condition.

In case of vehicular accident, an importance of accident analysis may differ between a vehicle condition in which an airbag is activated and a vehicle condition in which the airbag is not activated. Therefore, it is preferable to change an amount of vehicular data to be recorded in accordance with vehicle condition. According to the above-mentioned configuration, since an amount of recorded vehicular data is changed in accordance with vehicle condition, it is possible to provide effective data to analyze accident.

According to an embodiment of the present invention, the controller changes an amount of storing capacity for the vehicular data in the second memory device. The more a total score of seriousness of failure increases, the more amount of the control data area in the second memory device is changed to store the vehicular data. The total score is obtained by summing scores of failed sensors and actuators, each score being determined based on a kind of sensors and actuators.

In vehicular accident, an amount of vehicular data necessary for analyzing accident is differ depending on kinds of failure. Scores of specific sensor failure and specific actuator failure may be set higher than the other scores of failures. In this case, if the specific sensor or the specific actuator having higher score is failed, the system records larger amount of vehicular data compare to a case in which a sensor or actuator having lower score is failed. Therefore, it is possible to provide effective amount of vehicular data to an analysis purpose.

According to an embodiment of the present invention, the controller inhibits further overwriting to the control data area after the vehicular data is recorded on the control data area. Although, there is a possibility that vehicular data recorded in the control data area may be overwritten with control data by a vehicle control device, the controller inhibits overwriting to protect the recorded vehicular data.

According to an embodiment of the present invention, the second memory device includes a control data area where a learning control value, which substitutes a default value, is stored. The controller records vehicular data into the control data area where the learning control value is stored. In some cases, it is required to enable a limp home drive to vehicle. The limp home drive may be available by using default value of control data, even if learning control value is discarded. According to the above-mentioned configuration, it is possible to record vehicular data to control data area which stores data such as learning control data not essential to driving vehicle, and to enable a limp home drive.

According to an embodiment of the present invention, the controller records vehicular data generated by sensors or actuators in abnormal condition into the control data area which stores control data relating to the sensors or actuators in abnormal condition.

For example, in a case that sensor or actuator relating to a cruise control system becomes abnormal condition due to an abnormal situation or failure, the controller records vehicular data relating to the sensor or actuator, which is in the abnormal condition, into the control data area which initially stores data relating to the cruise control by overwriting manner. In a case that sensor or actuator relating to a throttle control system becomes abnormal condition, the controller records vehicular data relating to the sensor or actuator, which is in the abnormal condition, into the control data area which initially stores data relating to the throttle control by overwriting manner. In a case that a sensor or actuator relating to a specific control system becomes abnormal condition, the control data relating to the sensor or actuator in abnormal condition is no longer reliable to perform proper control, and is no longer necessary. The controller uses the control data area which initially stores the control data no longer necessary as data area for recording vehicular data in the same category. Therefore, it is possible to use the control data area efficiently.

According to an embodiment of the present invention, canceling the overwriting inhibition of the data area where the vehicular data is recorded and setting a default value of control data to the data area where the vehicular data is recorded are performed by using an external device. It is possible to reset and resume the apparatus to condition in which the apparatus can be used to record vehicular data again.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

First Embodiment

Figure 1:
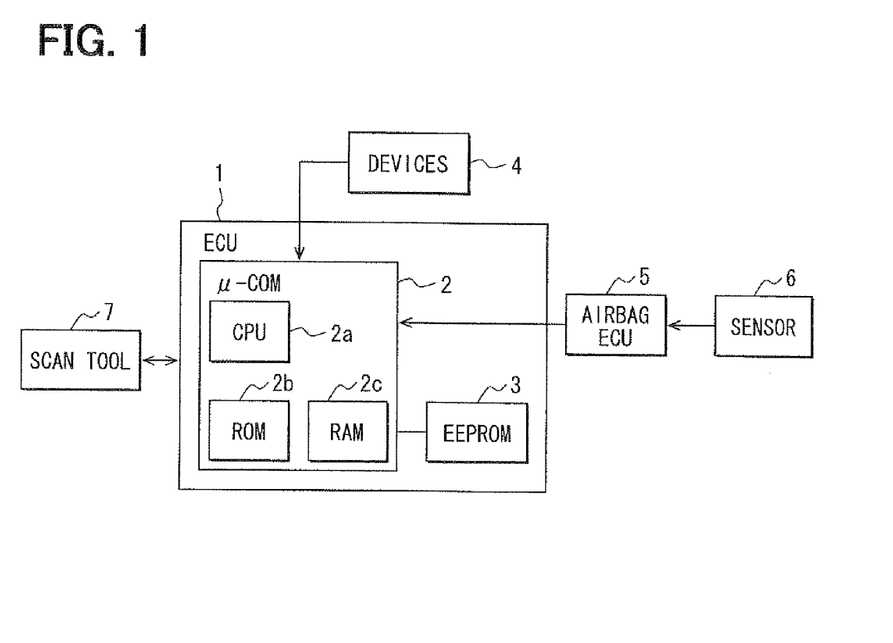
FIG. 1 is a block diagram showing electronic devices according to a first embodiment of the present invention.

Hereafter, a first embodiment of the present invention is explained with reference to the attached drawings, FIGS. 1 to 4. FIG. 1 shows a block diagram of electronic devices according to the first embodiment of the present invention. FIG. 1 shows a vehicular data recording system for recording vehicular data in vehicular accident such as a collision. In this specification, vehicular data means data which are stored or recorded to analyze vehicular accident. Therefore, vehicular data may be referred to as accident data or analyzable data. The system includes at least one vehicular safety device which is capable of detecting vehicular accident. The system also includes electronic devices which serve as data sources for generating vehicular data to be recorded. The system includes an apparatus for recording vehicular data and a controller for recording vehicular data. The system includes an electronic control unit (ECU) 1 that serves as the apparatus for recording vehicular data. The ECU 1 includes a microcomputer (μ-COM) 2 and a nonvolatile memory device (EEPROM) 3. The nonvolatile memory device 3 may be provided by an EEPROM device. The microcomputer 2 provides a controller. The microcomputer 2 also provides means for controlling recording process of vehicular data.

The microcomputer 2 includes CPU 2a, ROM 2b, RAM 2c. The CPU provides a controller for recording vehicular data by moving the vehicular data from the RAM 2c to the nonvolatile memory device 3. The ROM 2b stores fixed data such as control programs and default values of control data etc. The RAM 2c provides first recording means for recording vehicular data. The RAM 2c is provided by a device that is capable of high speed writing and is free of deterioration. For example, the RAM 2c may be provided by SRAM device. The RAM 2c temporarily stores instantaneous value of vehicular data. The RAM 2c may also be referred to as a back-up RAM.

Figure 3:
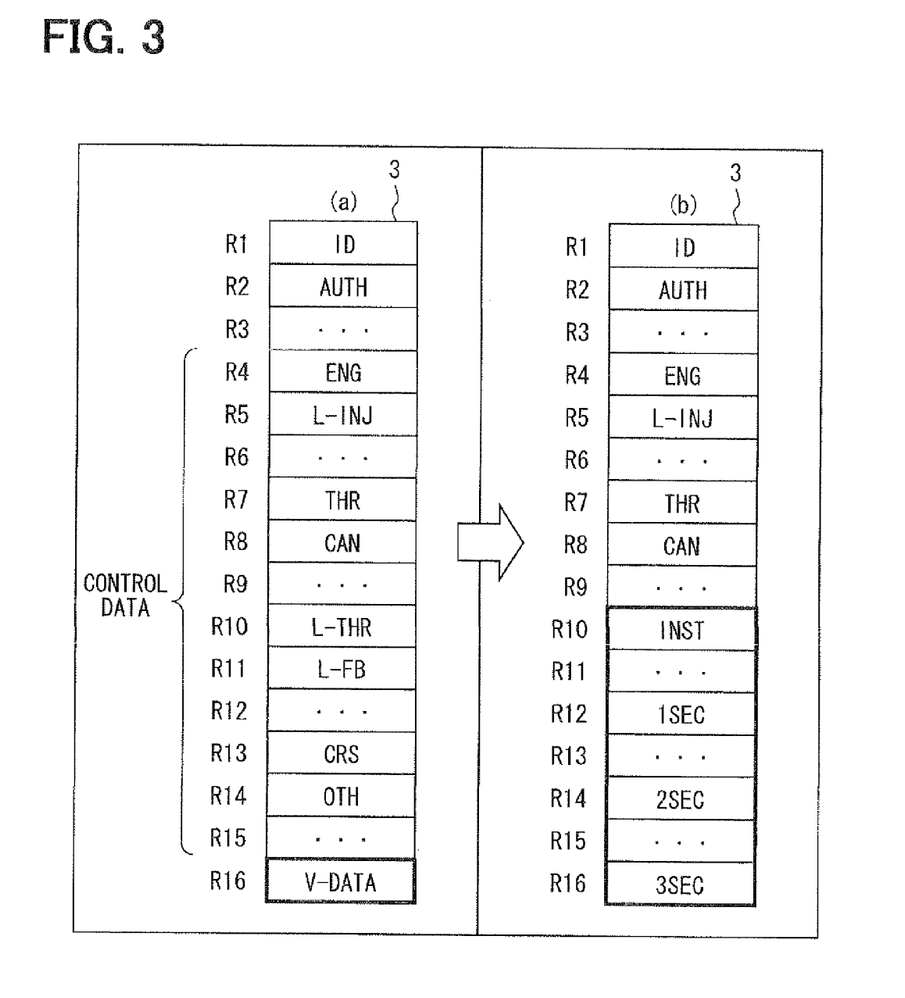
FIG. 3 is a diagram showing purpose of data recording area in a nonvolatile memory device in the first embodiment.

FIG. 3 is a diagram showing purpose of data recording area in the nonvolatile memory device 3. In FIG. 3, (a) shows purpose of data recording area during a normal operating condition of the vehicle. In FIG. 3, (b) shows purpose of data recording area after a vehicular accident such as a collision. As shown in FIG. 3, the purpose of at least a part of data recording area can be changed from a pre-accident purpose (a) to a post-accident purpose (b).

As shown in FIG. 3 (a), the nonvolatile memory device 3 includes several kinds of data area R1-R16. Data area R1-R3 stores important fixed items which are necessary for control, such as vehicular identification data (ID), legal authentication data (AUTH), and immobilizer data. Therefore, the data area R1-R3 is initially preserved for storing fixed data. Data area R4-R15 stores several kinds of control data such as variables in controls performed in the vehicle. For example, R4 stores engine control data (ENG), R5 stores learning control data (L-INJ) for fuel injector characteristics, R7 stores electronic controlled throttle valve control data (THR), and R8 stores vehicular network data (CAN), Further, R10 stores learning control data (L-THR) for throttle valve, R11 stores learning control data (L-FB) for feedback control, R13 stores cruise control data (CRS), and R14 stores control data (OTH) for the other vehicular control. The learning control data L-THR may indicates a completely closed position of the throttle valve. The learning control data L-FB may indicates a value for performing an air-fuel ratio feedback control. Therefore, the data area R4-R15 is initially preserved for storing control data. However, the data area R4-R15 may store vehicular data after vehicular accident, therefore, the data area R4-R15 may be referred to as dual-purpose data area. Data area R16 is especially preserved for storing vehicular data (V-DATA) which could be useful to analyze vehicular accident.

Referring to FIG. 1 again, the system includes a plurality of devices 4 including sensors and/or actuators. The devices 4 provide abnormal information and vehicular data. The abnormal information may be also referred to as malfunctioning information. Vehicular data may include operating value of actuators and detecting value of sensors. Vehicular data supplied from the devices 4 may include engine revolution speed, vehicle speed, engine coolant temperature, operating degree of gas pedal, operating history of gas pedal, opening degree of throttle valve, position of shift range, output of front G-sensor, output of rear G-sensor, and pressure of brake fluid.

The system includes an airbag ECU 5 and a sensor 6 for detecting collision, both serve as vehicular safety device. The airbag ECU 5 supplies an accident determining signal to the ECU 1 in response to a signal indicative of detection of collision from the sensor 6. Further, the airbag ECU 5 supplies an airbag activation signal to the ECU 1 when it activates an airbag. The airbag ECU 5 provides a first controller which is electrically connected with the sensor 6 and outputs information about vehicular accident based on an output signal from the sensor 6. In this case, the ECU 1 and the CPU 2a provides a second controller which is electrically connected with the first controller and records the vehicular data stored in the first memory device into the control data area of the second memory device by overwriting the control data in response to vehicular accident.

Figure 4:
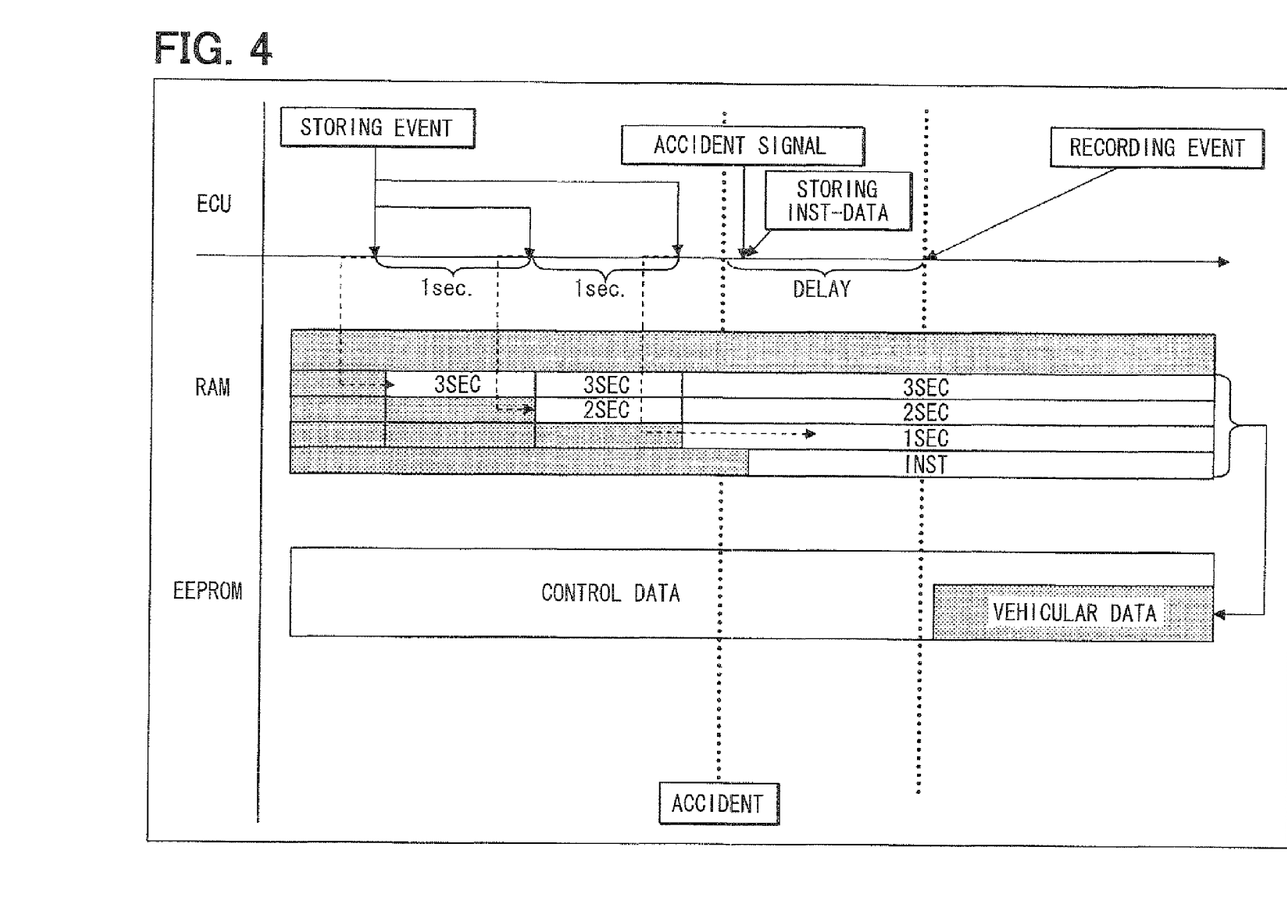
FIG. 4 is a diagram showing state transition for recording vehicular data in the first embodiment.

The system may further includes a scan tool 7 for outputting data recorded in the nonvolatile memory device 3. The scan tool 7 provides an external device. FIG. 4 shows state transition in ECU 1, RAM 2c, and the nonvolatile memory device 3 before and after vehicular accident. FIG. 4 shows data storing events in which a set of vehicular data is stored in the RAM 2c and data recording event in which a plurality of sets of vehicular data are transferred and recorded to the nonvolatile memory device 3. The RAM 2c provides a plurality of data areas for storing a plurality of sets of vehicular data for several times of storing events. In this embodiment, the RAM 2c provides an instantaneous data area for storing a set of vehicular data detected at or just after vehicular accident. Therefore, the RAM 2c stores the instantaneous data (INST). The RAM 2c also provides three pre-accident data areas for storing three sets of vehicular data detected at last three storing events. For example, the RAM 2c stores three sets of vehicular data (1 SEC, 2 SEC, and 3 SEC) detected and stored at three storing events which are within 1 second, 2 seconds and 3 seconds before vehicular accident.

The ECU 1 stores a set of vehicular data to the RAM 2c with a predetermined time interval, e.g., at every 1 second. The ECU 1 only stores three sets of vehicular data. The ECU 1 overwrites the stored data which was detected and stored at the storing event three seconds before with the latest vehicular data. The ECU 1 stores the instantaneous data which is vehicular data supplied at or just after vehicular accident in response to the accident determining signal from the airbag ECU 5. After the accident determining signal is received, the ECU 1 stops overwriting of stored data and maintains a plurality of sets of vehicular data including the instantaneous data, and three sets of vehicular data. Then, the ECU 1 transfers the stored data in the RAM 2c to the nonvolatile memory device 3 at a recording event which is set after a predetermined delay time from accident.

Figure 2:
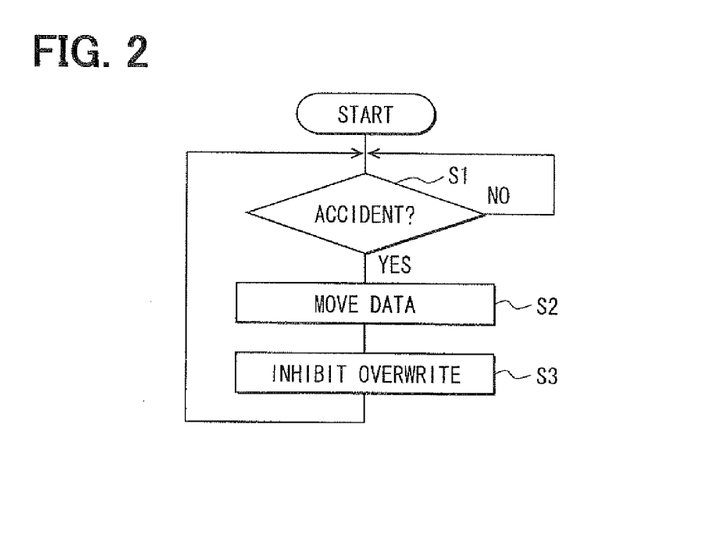
FIG. 2 is a flowchart showing process performed by a microcomputer according to the first embodiment.

FIG. 2 shows process performed by the microcomputer 2 of the ECU 1, which performs as a recording process controlling means. In detail, process shown in FIG. 2 is performed by the CPU 2a. In a step S1, the CPU 2a determines that whether the accident determining signal is received or not. If the signal is received, the process proceeds to a step S2. In a step S2, the CPU 2a moves the stored vehicular data in the RAM 2c to the nonvolatile memory device 3. As shown in FIG. 3, the stored vehicular data in the RAM 2c are moved to not only the data area R16 but also to the data area R10-R15. In the data area R10-R15, stored controls data such as L-THR are deleted by overwriting it with the vehicular data transferred from the RAM 2c. The CPU 2a outputs command to move and record the vehicular data stored in the RAM 2c into the data area which are usually used for storing control data. In other words, the CPU 2a provides command means for outputting command to record the vehicular data stored in the RAM 2c into the control data area in the nonvolatile memory device 3 in overwriting manner in response to information about vehicular accident. As a result, the purpose of the data area R10-R15 is changed from the control data area to the vehicular data area in response to the accident, and recording capacity for vehicular data is expanded. Even after the recording capacity for vehicular data is expanded, the nonvolatile memory device 3 still maintains some control data that are important to resume vehicle control after the accident.

As a result, the nonvolatile memory device 3 records four sets of vehicular data including INST, 1 SEC, 2 SEC, and 3 SEC. In a step S3, the CPU 2a inhibits further overwriting process to the control data area R10-R16 after the vehicular data is recorded on the control data area R10-R16. Inhibition of overwriting to the data area R10-R16 can be cancelled by using the scan tool 7. By using the scan tool 7, it is also possible to set default values of control data to the data area R10-R16.

According to the first embodiment, the accident determining signal which is information indicative of vehicle collision is supplied to the microcomputer 2 which works as a recording controller for controlling recording of vehicular data for analyzing accident. In response to the accident determining signal, the microcomputer 2 records vehicular data into the control data area R10-R15 in the nonvolatile memory device 3. The control data area R10-R15 is initially preserved for storing control data before accident. In order to accumulate sufficient data for a predetermined time prior to the accident, the vehicular data is stored in the RAM 2c before accident and is renewed cyclically. The microcomputer 2 records the vehicular data in the control data area R10-R15 by overwriting the control data stored there with the vehicular data. Therefore, it is not necessary to preserve a huge data area exclusive for vehicular data in addition to the control data area. It is possible to record sufficient amount of vehicular data. As a result, it is possible to record vehicular data without increasing the capacity of the nonvolatile memory device 3.

Second Embodiment

Figure 6:
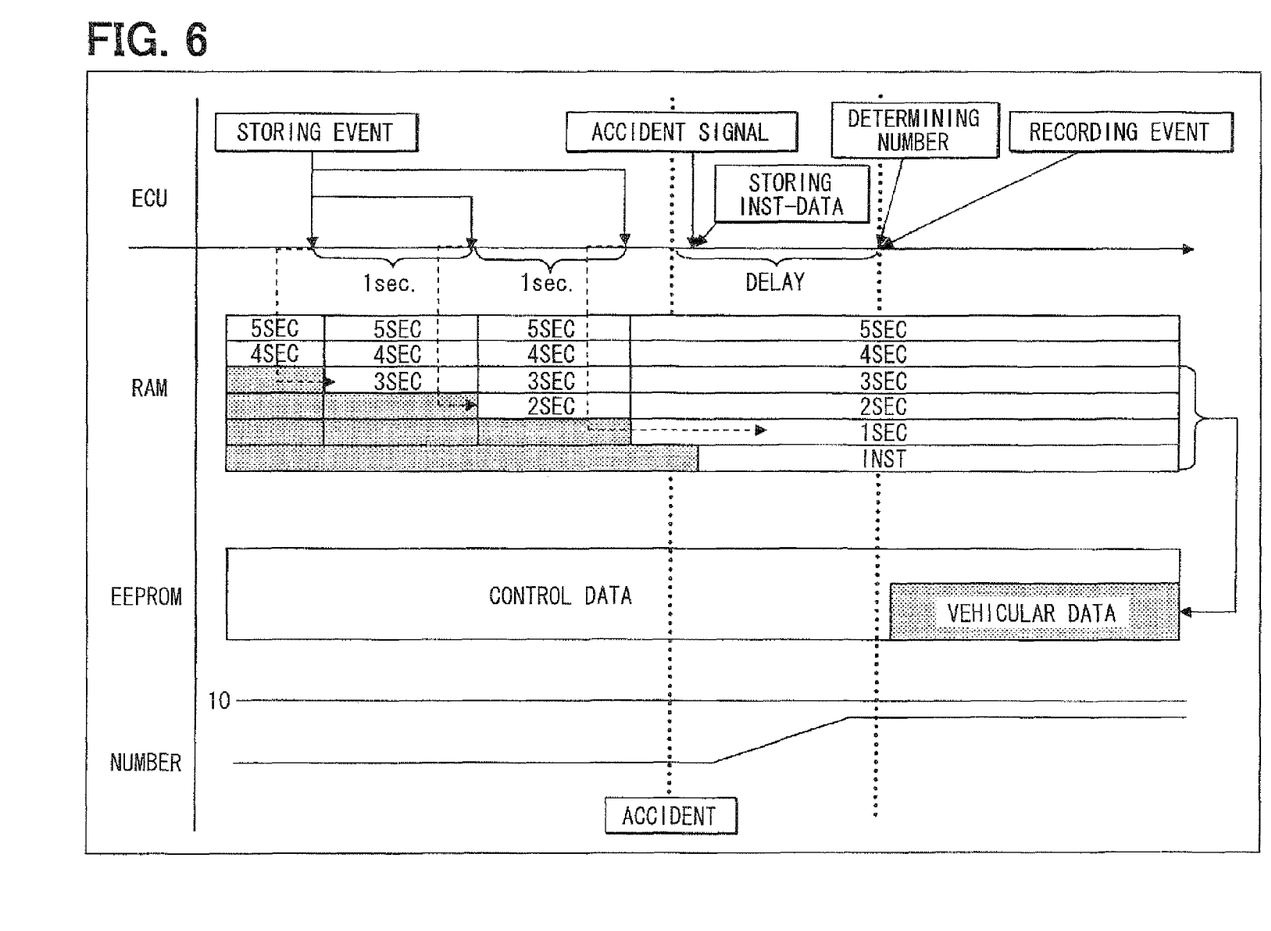
FIG. 6 is a diagram showing state transition for recording vehicular data in the second embodiment.
Figure 7:
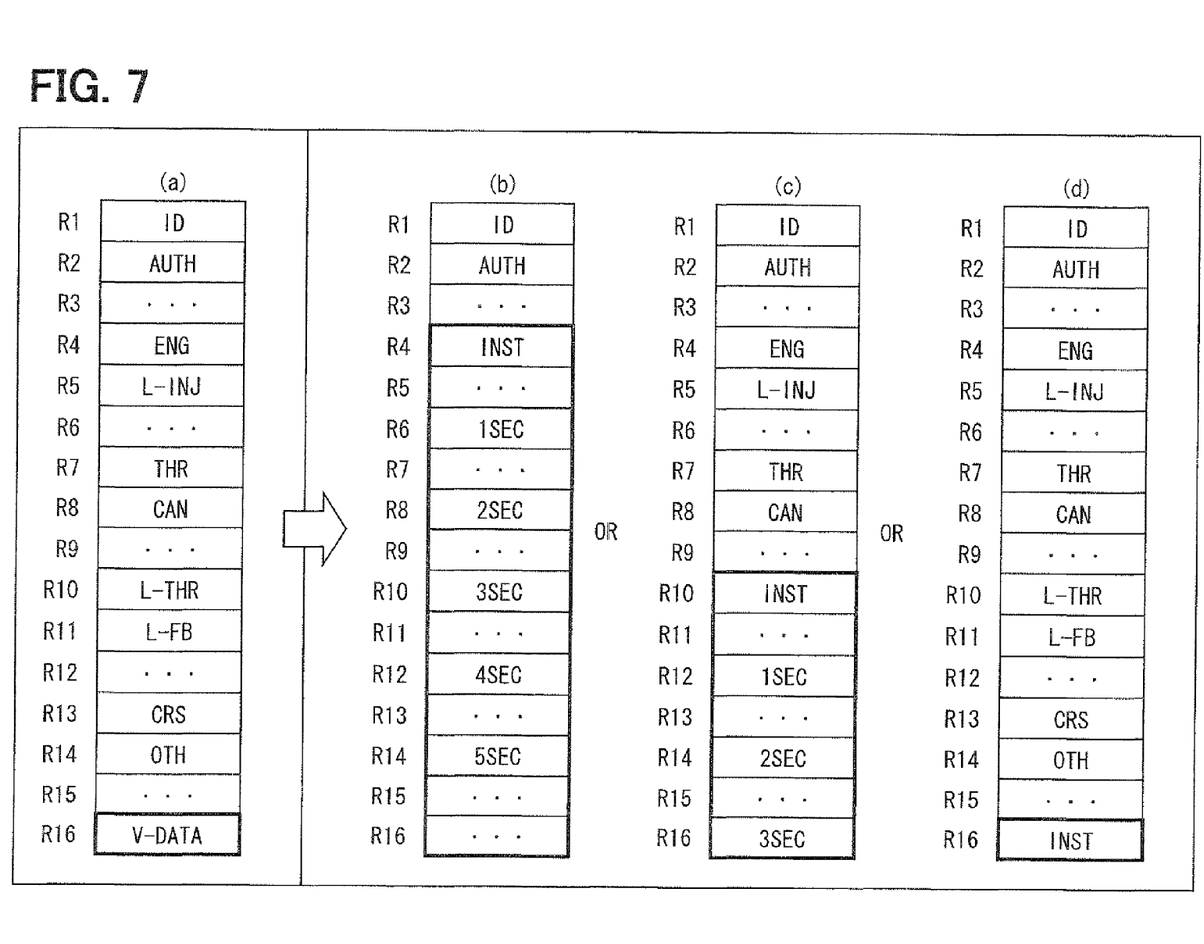
FIG. 7 is a diagram showing purpose of data recording area in a nonvolatile memory device in the second embodiment.

Next, a second embodiment is explained with reference to FIGS. 5 to 7. This embodiment has the same structure as shown in FIG. 1. Data recording sequence is illustrated in FIG. 6. The ECU 1 stores a plurality of sets of vehicular data to the RAM 2c with a predetermined time interval, e.g., at every 1 second. The ECU 1 only stores five sets of vehicular data. The ECU 1 overwrites the stored data which was detected and stored at the storing event five seconds before with the latest vehicular data. The ECU 1 also stores the instantaneous data which is vehicular data supplied at or just after vehicular accident in response to the accident determining signal from the airbag ECU 5. After the accident determining signal is received, the ECU 1 stops overwriting of stored data and maintains a plurality of sets of vehicular data including the instantaneous data, and five sets of vehicular data. Then, the ECU 1 transfers the stored data in the RAM 2c to the nonvolatile memory device 3 at a recording event which is set after a predetermined delay time from accident. At the same time, number of failure is determined. The ECU 1 receives information indicative of abnormal condition of the devices 11 including sensors and actuators. The ECU 1 counts the total number of devices 4 in abnormal condition as the number of failure.

Figure 5:
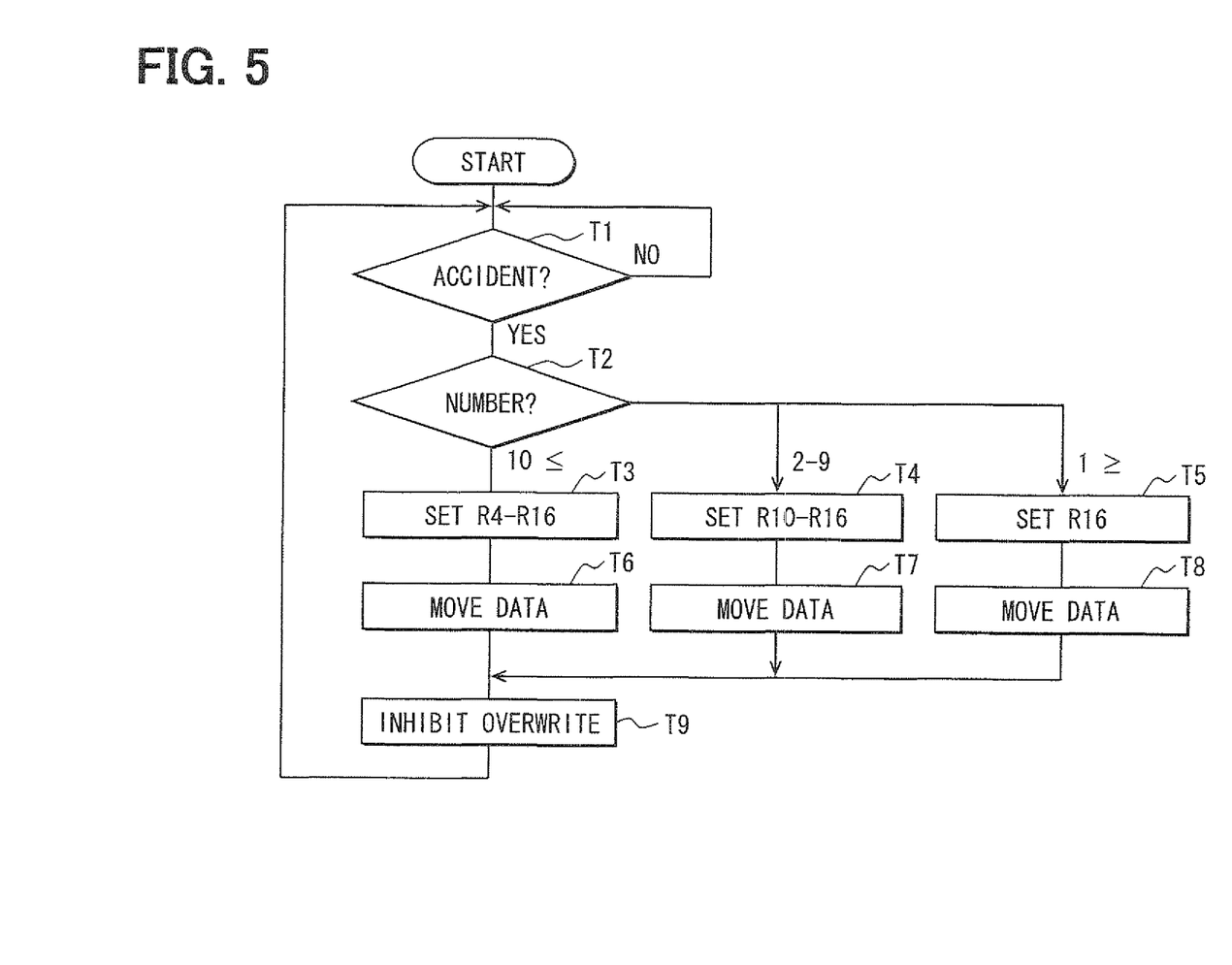
FIG. 5 is a flowchart showing process performed by a microcomputer according to a second embodiment of the present invention.

FIG. 5 shows a flowchart performed in the second embodiment. In a case that it is determined the accident determining signal is received in a step T1, the CPU 2a determines whether the number of failure is categorized in which area, such as ten or more, from two to nine, one or less in a step T2. The process branches into three sub-processes according to the number of failure. If the number of failure is ten or more (10<=), the process proceeds to a step T3. In the step T3, the CPU 2a sets the data area R4-R15, and R16 as data area for vehicular data in vehicular accident. In this case, almost all of data area, except for the fixed data area R1-R3, in the nonvolatile memory device 3 is used to store vehicular data. In this case, maximum storing capacity in the nonvolatile memory device 3 is used to store vehicular data. In a step S6, the CPU 2a records 6 sets of vehicular data, which includes INST, 1 SEC, 2 SEC, 3 SEC, 4 SEC, and 5 SEC, into the control data area R4-R15, and R16 in an overwriting manner. As a result, the vehicular data is recorded in the nonvolatile memory device 3 as shown in FIG. 7(b).

If the number of failure is two to nine (2-9), the process proceeds to a step T4. In the step T4, the CPU 2a sets the data area R10-R15, which is only a part of the dual-purpose data area R4-R15, and R16 as data area for vehicular data in vehicular accident. In this case, middle amount of storing capacity in the nonvolatile memory device 3 is used to store vehicular data. In a step S7, the CPU 2a records 4 sets of vehicular data, which includes INST, 1 SEC, 2 SEC, and 3 SEC, into the control data area R10-R15, and R16 in an overwriting manner. As a result, the vehicular data is recorded in the nonvolatile memory device 3 as shown in FIG. 7(c).

If the number of failure is one or less (1>=), the process proceeds to a step T5. In the step T5, the CPU 2a sets only the data area R16 as data area for vehicular data in vehicular accident. In this case, minimum storing capacity in the nonvolatile memory device 3 is used to store vehicular data. In a step S8, the CPU 2a records only one set of vehicular data INST into the data area R16 in an overwriting manner. As a result, the vehicular data is recorded in the nonvolatile memory device 3 as shown in FIG. 7(d).

In a step T9, the CPU 2a inhibits overwriting by turning on a flag which shows completion of recording and inhibition of overwriting.

According to the second embodiment, the CPU 2a is capable of being received abnormal information about sensors and actuators. The CPU 2a changes an amount of storing capacity for vehicular data in the nonvolatile memory device 3 so that the more the number of abnormal information increases, the more an amount of the control data area in the nonvolatile memory device 3 is changed to store the vehicular data in accident. Since the more the number of abnormal information increases, the more the amount of vehicular data useful for analyzing vehicular accident is recorded, therefore, it is possible to record sufficient amount of vehicular data for effectively analyzing accident.

According to the second embodiment, the CPU 2a records vehicular data into the control data area in the nonvolatile memory device in an overwriting manner, and then, inhibits overwriting to the data area where the vehicular data is recorded. In usual storing process, there is a possibility that data stored in the control data area could be overwritten again by means for performing vehicular control. However, in this embodiment, it is possible to protect the vehicular data once recorded in the nonvolatile memory device 3.

Third Embodiment

Figure 8:
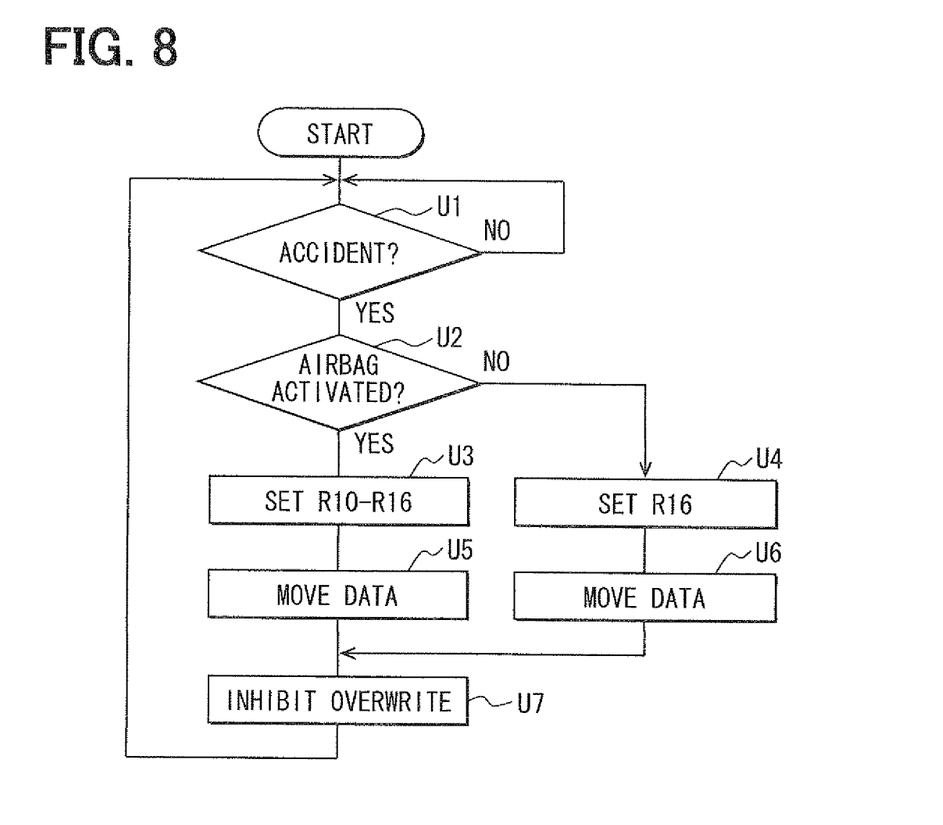
FIG. 8 is a flowchart showing process performed by a microcomputer according to a third embodiment of the present invention.

FIG. 8 is a flowchart showing process performed by a microcomputer according to a third embodiment of the present invention. In a case that it is determined the accident determining signal is received in a step T1, the CPU 2a determines whether the airbag is activated to deploy or not. The activated condition of the airbag is a predetermined vehicle condition in which recording amount of vehicular data should be increased. In other words, the activated condition and not activated condition of the airbag indicate level of seriousness of vehicular accident. Information indicative of activation of the airbag is supplied from the airbag ECU 5. In a case that the airbag is activated, the process proceeds to a step U3. In the step U3, the CPU 2a sets the data area R10-R15, which is only a part of the dual-purpose data area R4-R15, and R16 as data area for vehicular data in vehicular accident. In a step U5, the CPU 2a records 4 sets of vehicular data, which includes INST, 1 SEC, 2 SEC, and 3 SEC, into the control data area R10-R15, and R16 in an overwriting manner.

In a case that the airbag is not activated, the process proceeds to a step U4. In the step U4, the CPU 2a sets only the data area R16 as data area for vehicular data in vehicular accident. In a step U6, the CPU 2a records only one set of vehicular data INST into the data area R16 in an overwriting manner.

In a step U7, the CPU 2a inhibits overwriting by turning on a flag which shows completion of recording and inhibition of overwriting. According to the third embodiment, the CPU 2a changes amount of storing capacity for vehicular data in the nonvolatile memory device 3 in accordance with a predetermined vehicle condition. In other words, storing capacity for vehicular data in the activated condition is greater than that in the not activated condition. In a case of accident, importance of accident analysis in the vehicle condition in which the airbag is activated differs from that in the vehicle condition in which the airbag is not activated. According to the third embodiment, it is possible to provide efficient amount of vehicular data according to vehicle condition, such as level of seriousness, level of importance, or level of impact. The control data area set at the step U3 may be specific control data area which is initially assigned to store control data which is not used to control the vehicle after the accident, such as in a limp home drive control from the accident site to an evacuation site.

Fourth Embodiment

Figure 9:
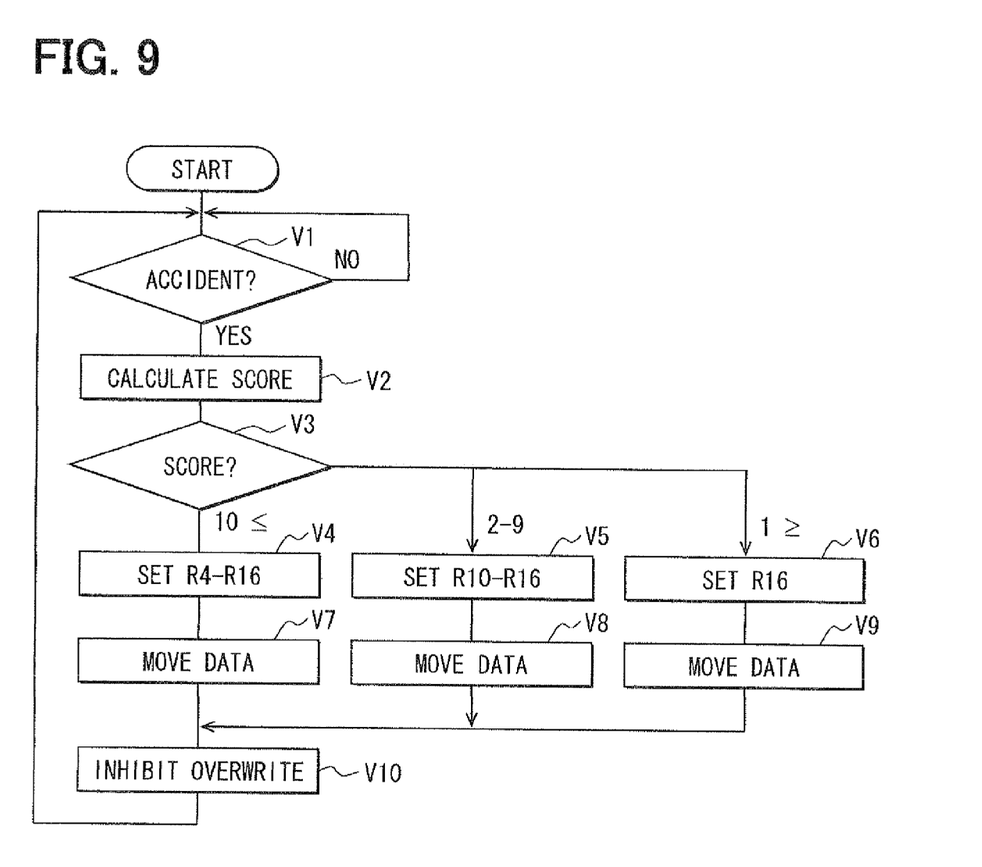
FIG. 9 is a flowchart showing process performed by a microcomputer according to a fourth embodiment.
Figure 10:
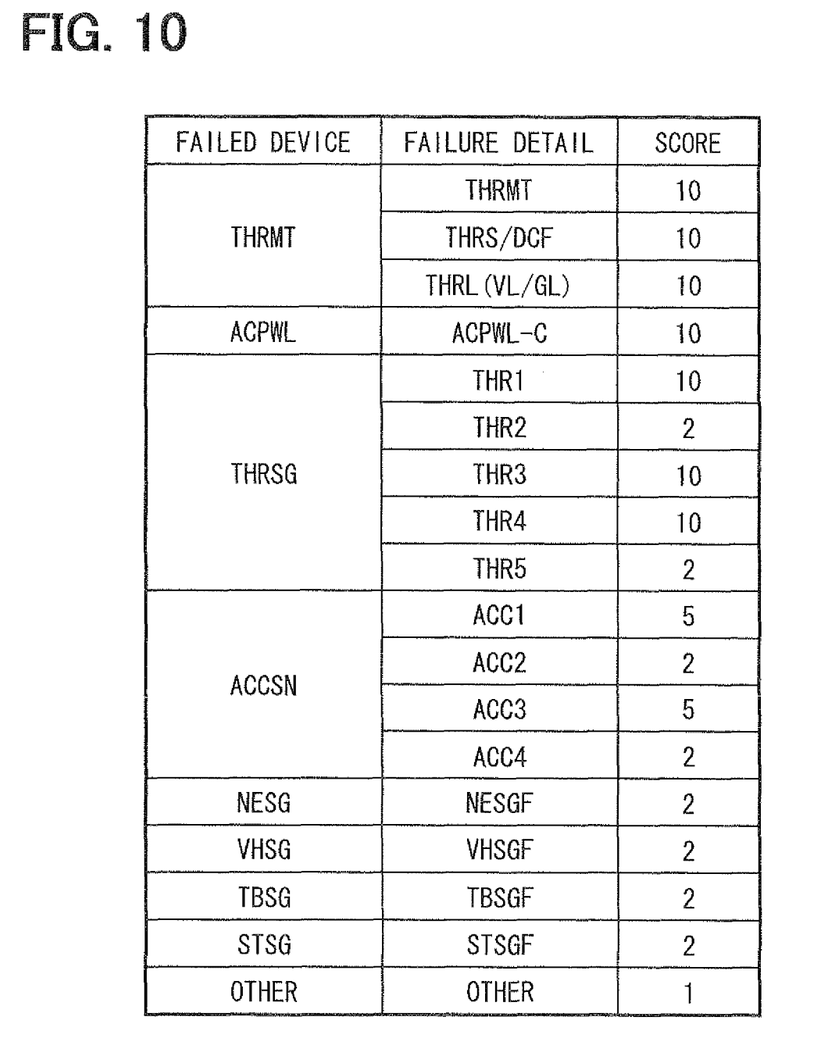
FIG. 10 is a table showing score which is set according to seriousness of failure of specific device.

FIG. 9 shows a flowchart showing process performed by a microcomputer 2a according to a fourth embodiment. In a case that it is determined the accident determining signal is received in a step V1, the CPU 2a, in a step V2, evaluates and determines seriousness of accident based on details of failure occurred by the accident. FIG. 10 is a table showing score which is set according to seriousness of failure of specific device. The scores are predetermined for each of failure of each device, such as a sensor and an actuator. The score is predetermined based on importance of the sensor or actuator failed.

The following abbreviations are used in FIG. 10. THRMT stands for a throttle motor and its failure. ACPWL stands for an actuator system power supply line. THRSG stands for signal from a throttle sensor. ACCSG stands for signal from a gas pedal sensor or an acceleration pedal sensor. NESG stands for signal from an engine revolution speed sensor. VHSG stands for signal from a vehicle speed sensor. TBSG stands for signal from a turbine rotational speed sensor. STSG stands for signal indicative of turning on or off of a stop lamp. OTHER stands for the other failure devices or the other failure details.

THRS/DCF stands for short circuit in the throttle motor and/or failure of drive circuit for the throttle motor. THRL (VL/GL) stands for throttle motor lock including stacking of a throttle valve and stacking of a motor gear train. ACPWL-C stands for disconnection of the actuator system power supply line.

THR1 stands for a first grade failure of throttle sensor signal, including definitive disconnection and definitive short circuit. THR2 stands for a second grade failure of throttle sensor signal, including provisional disconnection and provisional short circuit. THR3 stands for a third grade failure of throttle sensor signal, including definitive out of range failure. THR4 stands for a fourth grade failure of throttle sensor signal, including provisional out of range failure occurred intermittently. THR5 stands for a fifth grade failure of throttle sensor signal, including provisional out of range failure.

ACC1 stands for a first grade failure of acceleration sensor signal, i.e., gas-pedal-sensor signal, including definitive disconnection and definitive short circuit. ACC2 stands for a first grade failure of acceleration sensor signal, including provisional disconnection and provisional short circuit. ACC3 stands for a first grade failure of acceleration sensor signal, definitive out of range failure. ACC4 stands for a first grade failure of acceleration sensor signal, provisional out of range failure.

NESGF stands for engine revolution speed sensor signal failure, including disconnection, short circuit, instantaneous lost of signal, and noise. VHSGF stands for vehicle speed sensor signal failure, including disconnection, short circuit, instantaneous lost of signal, and noise. TBSGF stands for turbine revolution speed sensor signal failure, including disconnection, short circuit, instantaneous lost of signal, and noise. STSGF stands for stop lamp signal failure, including disconnection and short circuit. A sensor or an actuator that affects vehicle control relating to driving performance is ranked to have a relatively higher score. The score roughly corresponds to weight showing seriousness of failure. For example, throttle motor-related failures, and actuator system power supply line failures are ranked higher. For example, sensors and actuators relating to a throttle control are ranked higher.

The CPU 2a sums scores to calculate a total of scores. If the total score is ten or more (10<=), the process proceeds to a step V4. In the step V4, the CPU 2a sets the data area R4-R15, and R16 as data area for vehicular data in vehicular accident. In a step V7, the CPU 2a records 6 sets of vehicular data, which includes INST, 1 SEC, 2 SEC, 3 SEC, 4 SEC, and 5 SEC, into the control data area R4-R15, and R16 in an overwriting manner. As a result, the vehicular data is recorded in the nonvolatile memory device 3 as shown in FIG. 7(b).

If the total score is two to nine (2-9), the process proceeds to a step V5. In the step V5, the CPU 2a sets the data area R10-R15, which is only a part of the dual-purpose data area R4-R15, and R16 as data area for vehicular data in vehicular accident. In a step V8, the CPU 2a records 4 sets of vehicular data, which includes INST, 1 SEC, 2 SEC, and 3 SEC, into the control data area R10-R15, and R16 in an overwriting manner. As a result, the vehicular data is recorded in the nonvolatile memory device 3 as shown in FIG. 7(c).

If the total score is one or less (1>=), the process proceeds to a step V6. In the step V6, the CPU 2a sets only the data area R16 as data area for vehicular data in vehicular accident. In a step V9, the CPU 2a records only one set of vehicular data INST into the data area R16 in an overwriting manner. As a result, the vehicular data is recorded in the nonvolatile memory device 3 as shown in FIG. 7(d).

In a step V10, the CPU 2a inhibits overwriting by turning on a flag which shows completion of recording and inhibition of overwriting.

According to the fourth embodiment, the total score is obtained by summing scores of failed sensors and actuators, each score being determined based on a kind of sensors and actuators. The controller changes an amount of storing capacity for the vehicular data in the nonvolatile memory device so that the more a total score of seriousness of failure increases, the more amount of the control data area in the nonvolatile memory device is changed to store the vehicular data.

In case of vehicular accident, an amount of vehicular data necessary for analyzing accident depends on the kind of failure. If an amount of recorded vehicular data is fixed, some kinds of failure may require more amount of data, and the other kinds of failure may only require less amount of data. The fourth embodiment is configured to address the above-mentioned disadvantage relating to an amount of data. According to the fourth embodiment, the system varies an amount of vehicular data to be recorded at vehicular accident in accordance with importance or seriousness of specific sensor failure or specific actuator failure. For example, in a case that a specific sensor failure or specific actuator failure is considered to have some relation to a specific vehicular accident which requires relatively large amount of vehicular data, scores of the specific sensor failure and specific actuator failure may be set higher than the other scores of failures. In this case, if the specific sensor or the specific actuator having higher score is failed, the system records larger amount of vehicular data compare to a case in which a sensor or actuator having lower score is failed. Therefore, it is possible to provide effective amount of vehicular data to an analysis purpose.

Other Embodiments

The present invention may be practiced in the following modified forms of the above-mentioned embodiments. An apparatus for recording vehicular data may store a default value and a learning control value for one of the control data. The second memory device, the nonvolatile memory device 3 includes a control data area where a learning control value, which substitutes a default value, is stored. In this configuration, the controller may be configured to record the vehicular data into the control data area where the learning control value is stored, when the learning control value is stored in the control data area. For example, in the case of FIG. 3 (a), the data area preserved for storing the learning control data L-INJ, L-THR, L-FB may store default value which could be obtained by initial setting process or learning control values which is obtained as a result of learning process. Default values for those learning control data are stored in the ROM 2b. The microcomputer 2 preferentially sets those control data area R5, R10, and R11 where the learning control values may be stored as area for recording vehicular data.

The learning control values are used to improve control accuracy compare to a default value. Therefore, even if the learning control value is deleted by overwriting it with the vehicular data, it is still possible to control the vehicle.

In this modification, vehicular data is recorded in the control data area that stores control data which would not affect fundamental driving performance of the vehicle. As a result, it is possible to drive the vehicle in a limp home manner even after vehicular accident. It is usually possible to drive the vehicle in the limp home manner by using the default values only. The microcomputer 2 may be configured to store the vehicular data only in the control data area R5, R10, and R11 where the learning control values are stored.

Further, the present invention may be practiced in the following modified embodiment. The controller may be configured to record vehicular data generated by sensors or actuators in abnormal condition into the control data area which stores control data relating to the sensors or actuators in abnormal condition.

For example, in a case that sensor or actuator relating to a cruise control system becomes abnormal condition due to an abnormal situation or failure, the microcomputer 2 may records vehicular data relating to the sensor or actuator, which is in the abnormal condition, into the control data area which initially stores data relating to the cruise control by overwriting manner. In a case that sensor or actuator relating to a throttle control system becomes abnormal condition, the microcomputer 2 may record vehicular data relating to the sensor or actuator, which is in the abnormal condition, into the control data area which initially stores data relating to the throttle control by overwriting manner. If a sensor or actuator relating to a specific control system becomes abnormal condition, the control data relating to the sensor or actuator in abnormal condition is no longer reliable to perform proper control, and is no longer necessary. In this modification, the microcomputer 2 uses the control data area which initially stores the control data no longer necessary as data area for recording vehicular data in the same category. Therefore, it is possible to use the control data area efficiently.

For further modification, the control data are not limited to the examples shown in FIG. 3. It is possible to store several kinds of data in the nonvolatile memory device 3 as control data. It is also possible to change data content of vehicular data. The first memory device is not limited to SRAM device. The second memory device is not limited to EEPROM device. For example, the second memory device may be provided by the other type of nonvolatile memory device. The first memory device may be disposed on the outside of the microcomputer 2. The second memory device may be disposed on the outside of the microcomputer 2.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An apparatus for recording vehicular data, comprising:
a first memory device which temporarily stores vehicular data, wherein the vehicular data includes at least operating data of an actuator and/or detecting data of a sensor;
a second memory device which has control data area for storing control data in nonvolatile manner, wherein the control data is data used to control a vehicle; and
a controller which records the vehicular data stored in the first memory device into the control data area of the second memory device by overwriting the control data in response to vehicular accident.

2. The apparatus for recording vehicular data in claim 1, wherein
the controller is configured to receive abnormal information about at least one of the sensor or the actuator, and wherein the controller changes an amount of storing capacity for the vehicular data in the second memory device so that the more a number of the abnormal information increases, the more an amount of the control data area in the second memory device is changed to store the vehicular data.

3. The apparatus for recording vehicular data in claim 1, wherein
the controller changes amount of storing capacity for the vehicular data in the second memory device in accordance with a predetermined vehicle condition.

4. The apparatus for recording vehicular data in claim 1, wherein
the controller changes an amount of storing capacity for the vehicular data in the second memory device so that the more a total score of seriousness of failure increases, the more amount of the control data area in the second memory device is changed to store the vehicular data, the total score being obtained by summing scores of failed sensor(s) and actuator(s), each score being determined based on a kind of sensor(s) and actuator(s).

5. The apparatus for recording vehicular data in claim 1, wherein
the controller inhibits further overwriting to the control data area after the vehicular data is recorded on the control data area.

6. The apparatus for recording vehicular data in claim 5, wherein
inhibition of the overwriting to the control data area where the vehicular data is recorded is canceled;
a default value of control data to the control data area where the vehicular data is recorded is set; and
canceling the inhibition of the overwriting and setting the default value are performed by using an external device.

7. The apparatus for recording vehicular data in claim 1, wherein
the controller records vehicular data generated by the sensor or the actuator in abnormal condition into the control data area which stores control data relating to the sensor or actuator in abnormal condition.

8. The apparatus for recording vehicular data in claim 1, wherein
the second memory device includes a control data area where a learning control value, which substitutes a default value, is stored, and wherein the controller records vehicular data into the control data area where the learning control value is stored.

9. The apparatus for recording vehicular data in claim 1, wherein the vehicular data includes engine revolution speed, vehicle speed, engine coolant temperature, operating degree of a gas pedal, operating history of the gas pedal, opening degree of a throttle valve, position of a shift range, output of a front G-sensor, an output of a rear G-sensor, and/or pressure of brake fluid.

10. A vehicular data recording system comprising:
a sensor;
a first controller which is electrically connected with the sensor and outputs information about vehicular accident based on an output signal from the sensor;
a first memory device which temporarily stores vehicular data, wherein the vehicular data includes at least operating data of an actuator and/or detecting data of the sensor or another sensor;
a second memory device which has a control data area for storing control data in nonvolatile manner, wherein the control data is data used to control a vehicle;
a second controller which is electrically connected with the first controller and records the vehicular data stored in the first memory device into the control data area of the second memory device by overwriting the control data in response to vehicular accident.

11. A controller for recording vehicular data, the controller controlling a first memory device which temporarily stores vehicular data and a second memory device which has control data area for storing control data in nonvolatile manner, wherein the vehicular data includes at least operating data of an actuator and/or detecting data of a sensor and wherein the control data is data used to control a vehicle, the controller comprising:

command means for outputting command to record the vehicular data stored in the first memory device into the control data area in the second memory device in overwriting manner in response to information about vehicular accident.

\* \* \* \* \*